UNITED STATES PATENT OFFICE.

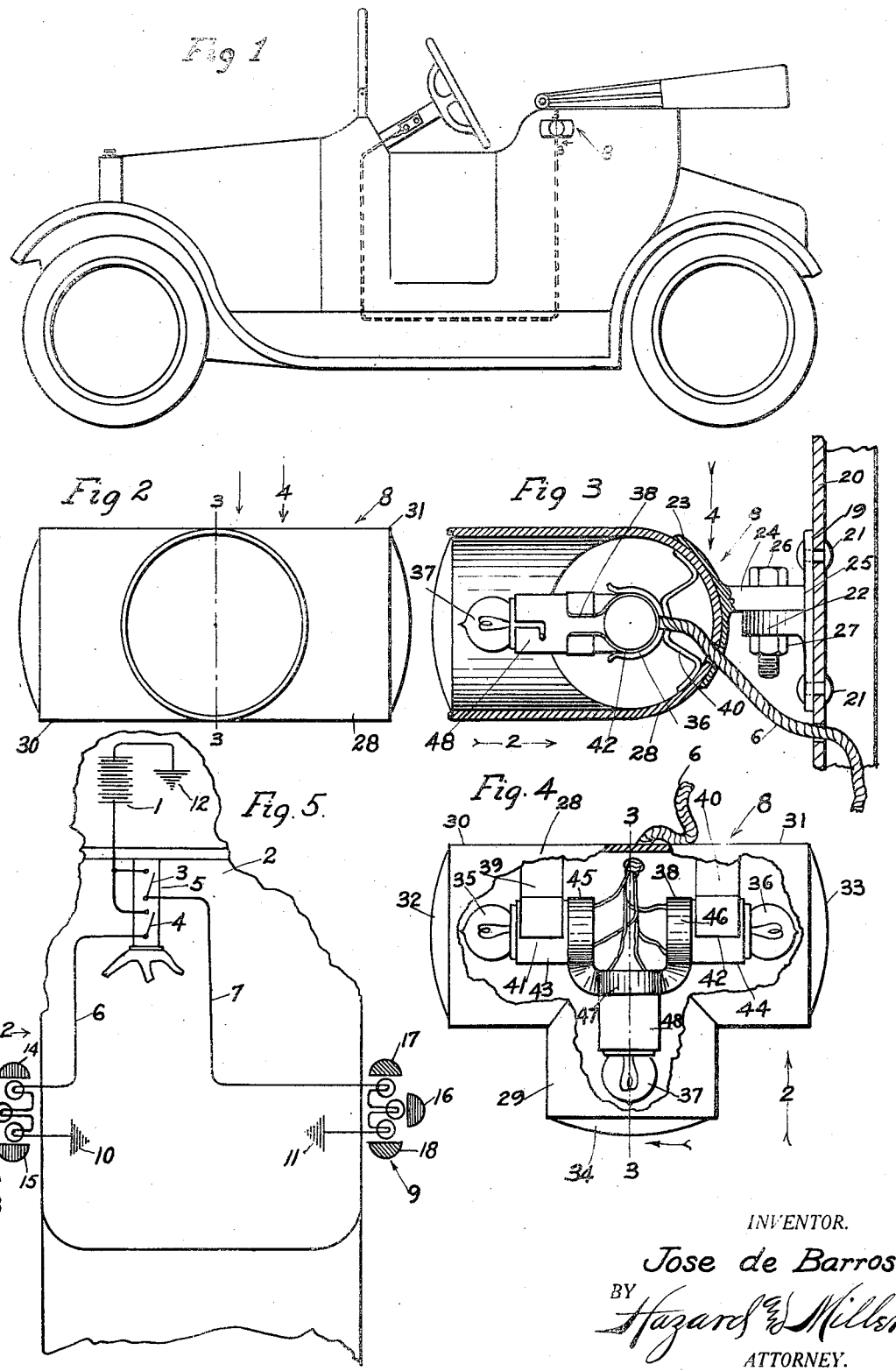

JOSE DE BARROS, OF IMPERIAL, CALIFORNIA.

AUTOMOBILE-SIGNAL.

1,322,880.  Specification of Letters Patent.  Patented Nov. 25, 1919.

Application filed December 30, 1918. Serial No. 268,978.

*To all whom it may concern:*

Be it known that I, JOSE DE BARROS, a citizen of the United States, residing at Imperial, in the county of Imperial and State of California, have invented new and useful Improvements in Automobile-Signals, of which the following is a specification.

My invention relates to automobile signals and consists of the novel features herein shown, described and claimed.

Figure 1 is a side elevation of an automobile equipped with signals in accordance with the principles of my invention.

Fig. 2 is an enlarged side elevation of one of the signals as seen looking in the direction indicated by the arrows 2 in Figs. 2, 4 and 5, the automobile body being omitted.

Fig. 3 is an enlarged fragmentary vertical sectional detail substantially on the line 3—3 of Figs. 1, 2 and 4.

Fig. 4 is a top plan view looking in the direction indicated by the arrows 4 in Figs. 2 and 3, parts being broken away and shown in section.

Fig. 5 is a fragmentary diagrammatic plan of a car body equipped with signals in accordance with the principles of my invention.

Referring to Fig. 5, the battery 1 is grounded upon the frame of the car body 2, and the other end of the battery is connected to the switches 3 and 4 mounted upon the steering post 5, and from the switches 3 and 4 the lines 6 and 7 lead to the signals 8 and 9 mounted upon the sides of the car body, and the signals are grounded upon the car body as indicated at 10 and 11. The ground for the battery 1 is indicated at 12. The signal 8 mounted upon the left-hand side of the car body 2 consists of three red lights 13, 14 and 15. The red light 13 reflects sidewise, the red light 14 reflects forwardly and the red light 15 reflects backwardly. The signal 9 is mounted upon the right-hand side of the car body 2 and consists of the red light 16 reflecting sidewise, the green light 17 reflecting forwardly and the green light 18 reflecting backwardly.

The signals 8 and 9 are intended for use in operating the automobile at night, and when the signals are illuminated and the automobile is viewed from the rear or from the front, the automobile will be between a green light and a red light, and it will be understood that if the automobile is viewed from the rear the red lights are upon the left-hand side and the green lights upon the right-hand side, and if the automobile is viewed from the front the green lights are upon the left-hand side and the red lights upon the right-hand side. In this way it will be readily understood which way the automobile is headed and how to avoid collision.

The signals 8 and 9 are substantially alike except in the coloring of the lenses.

Referring to Figs. 2, 3 and 4, the details of the signal 8 are as follows:

An attaching plate 19 is secured to the wall 20 of the body of the automobile by rivets 21. A bearing 22 extends outwardly from the attaching plate 19, the axis of the bearing being vertical. An attaching plate 23 has a bearing 24 mating with, and resting upon, the bearing 22. The bearing 24 has a square face 25 fitting against the attaching plate 19. A clamping bolt 26 is inserted downwardly through the bearing 24 and through the bearing 22, and a nut 27 is removably mounted upon the lower end of the bolt 26, so that by removing the nut the signal may be removed from the automobile, and so that by applying the nut and screwing it tight the signal is rigidly held relative to the automobile body.

The casing 28 is made like a stove pipe T and the attaching plate 23 is soldered or otherwise secured to the side of the T opposite the side outlet, so that the side outlet 29 projects horizontally outwardly from the automobile in a line transverse of the line of travel, and so that the end outlets 30 and 31 project forwardly and backwardly respectively. A red lens 32 is fixed in the forward end of the outlet 30 to make the red light 14, a similar red lens 33 is fixed in the rear end of the outlet 31 to make the red light 15, and a similar red lens 34 is fixed in the outer end of the outlet 29 to make the red light 13. The electric line 6 passes through the casing under the nut 27 and is connected to the lamp bulbs 35, 36 and 37. The lamp bulbs 35, 36 and 37 are mounted in a three-way fitting 38 so as to be held in position directly behind the lenses 32, 33 and 34. The brackets 39 and 40 are fixed in the casing 28 and have forks 41 and 42 to engage the lamp sockets 43 and 44 carrying the lamps 35 and 36. The fitting 38 is made of strap metal and has loops 45 and 46 to receive the sockets 43 and 44, and a loop 47 to receive the socket 48 carrying the lamp 37. The lamps 35, 36 and 37 are controlled to be turned on or off by manipulating the switch 4.

The signal 9 is identical in construction with the signal 8 except that the lenses 32 and 33 are green in the signal 9.

Various changes may be made without departing from the spirit of my invention as claimed.

I claim:

In combination with an automobile body a signal formed of a T shaped casing having red lenses in the three openings thereof and a lamp mounted within the casing, said casing being mounted on the left hand side of the body of the automobile in such a position that a red light is cast forwardly and backwardly and outwardly of the automobile, and a second T shaped casing properly mounted upon the right hand side of the automobile body carrying a lamp and having green lenses in the ends of the straight position, and a red lens in the stem of the T shaped casing being so positioned that a green light would be cast forwardly and backwardly and a red light would be cast outwardly from the automobile.

In testimony whereof I have signed my name to this specification.

JOSE DE BARROS.